United States Patent

[11] 3,550,757

| [72] | Inventor | Peter D. Kaspar |
| | | Dover, Del. |
| [21] | Appl. No. | 704,918 |
| [22] | Filed | Feb. 12, 1968 |
| [45] | Patented | Dec. 29, 1970 |
| [73] | Assignee | International Playtex Corporation, |
| | | Dover, Del. |
| | | a corporation of Delaware |

[54] APPARATUS FOR SUPPORTING, TENSIONING, AND DRIVING A FLEXIBLE CONVEYOR
26 Claims, 3 Drawing Figs.

| [52] | U.S. Cl. | 198/184 |
| [51] | Int. Cl. | B65g 15/00 |
| [50] | Field of Search | 198/193, 194, 208, 184 |

[56] References Cited
UNITED STATES PATENTS

| 1,661,657 | 3/1928 | Grabill | 198/194 |
| 2,234,537 | 3/1941 | Blackburn | 198/194 |

*Primary Examiner*—Richard E. Aegerter
*Attorney*—Stewart J. Fried

ABSTRACT: Apparatus for supporting, tensioning, and driving a flexible conveyor so that it will be held taut and substantially wrinkle free during its conveying operation.

Means are provided for maintaining substantially uniform tension on the flexible conveyor as it travels both in a straight and in a curved path by providing an intermediate tensioning means between an edge of the conveyor and its associated drive means.

3,550,757

APPARATUS FOR SUPPORTING, TENSIONING, AND DRIVING A FLEXIBLE CONVEYOR

SUMMARY OF THE INVENTION

This invention is an apparatus for supporting and tensioning a conveyor as it is driven.

The apparatus is particularly adapted to drive, support and tension a flexible conveyor that has a good deal of open work and can be easily distorted, and that tends to stretch in a cross machine direction after prolonged use.

One edge of the conveyor is connected to a driving means adjacent that edge and remains in constant substantially parallel alignment with it while the other edge of the conveyor is connected to a driving means adjacent this other edge through an intermediate elastic means attached to such other edge which tensions the flexible conveyor in a novel and highly effective manner.

It is particularly difficult to keep a flexible conveyor taut and wrinkle free as it is being driven because the various forces on the conveyor caused by its movement tend to be uneven or jerky and this creates areas of uneven stress and strain which, in turn, form wrinkles in the conveyor.

This problem is greatly accentuated when the conveyor being driven is long and thin and has varying unequal widths randomly disposed throughout its length. In such a conveyor there is no constant to rely on; a given pulling force to drive the conveyor may work well and tension properly without creating wrinkles at one point of given width but fail completely and create an unequal tension and hence a wrinkle at another point where the width varies even slightly from the given width. Even if it would be possible to create proper tension at all the varying points of unequal width throughout the conveyor through careful and minute adjustments, a slight change in width of the conveyor at a certain point due to stretching can throw all these adjustments out of kilter and create the wrinkles and improper tensioning applicant seeks to and does eliminate by his invention.

By holding the one edge of the conveyor in a parallel relationship with its associated driving means we establish a constant index base for making any controls and adjustments and the parallel alignment further enables the tension to be distributed evenly at that edge in a relatively simple manner. The other edge is the problem.

The relationship or alignment of the other edge of the conveyor may vary with respect to the drive means to which it is connected but applicant's novel tensioning means regulates the tension at such other edge irrespective of such variations. Further, the stretching of the conveyor in the cross machine direction will or may cause the alignment of such edge with respect to such driving means to change repeatedly and in a random manner; nonetheless, applicant's tensioning means will maintain proper tension on the conveyor at all times even with such random stretching of the conveyor.

This is accomplished by smoothly distributing the various forces acting upon the conveyor by means of the intermediate elastic means adjustably connected to the unaligned edge and to the drive means adjacent that edge. The elastic means is slidably received in eyelets in a border strip of zero stretch affixed to this edge and constantly seeks to create and distribute equally the various forces acting upon the conveyor, thus giving equalized and uniform tension all along the unaligned edge as the conveyor moves. By so doing, the surfaces of the conveyor are kept smooth and wrinkle free.

Perhaps most significant of all, the tensioning means maintains such uniform tensioning even when the conveyor is diverted from a flat plane of travel to a curved travel path and back to a flat travel plane.

Another important advantage found in applicant's apparatus is the ability to adjust the tension on the conveyor uniformly and to accept limits by use of a single means.

It has long been a problem in the conveyor arts to drive and maintain conveyors along predetermined paths. In many cases, the improper movement or creeping of the conveyor is due to variations in its own dimensions. If the conveyor has different dimensions along its edges or if it is subjected to varying tensions at different points which may cause the conveyor to stretch unevenly, the conveyor will lose its tendency to stay in proper alignment because of these differences in dimension.

Various approaches have been taken to solve this problem including the use of cumbersome guide members and also the very careful adjustment of the conveyors. It has been found that even with careful adjustments and use of guides that after a relatively short period of operation the conveyors stretch at certain points in an irregular manner and become distorted with the result that the conveyors again start creeping laterally.

In providing uniform tensioning of the conveyor, applicant has further provided a means which assures that the conveyor will be driven along its predetermined path without damaging lateral movement and in an undistorted manner.

DESCRIPTION OF THE PREFERRED EMBODIMENT

Figure 1:
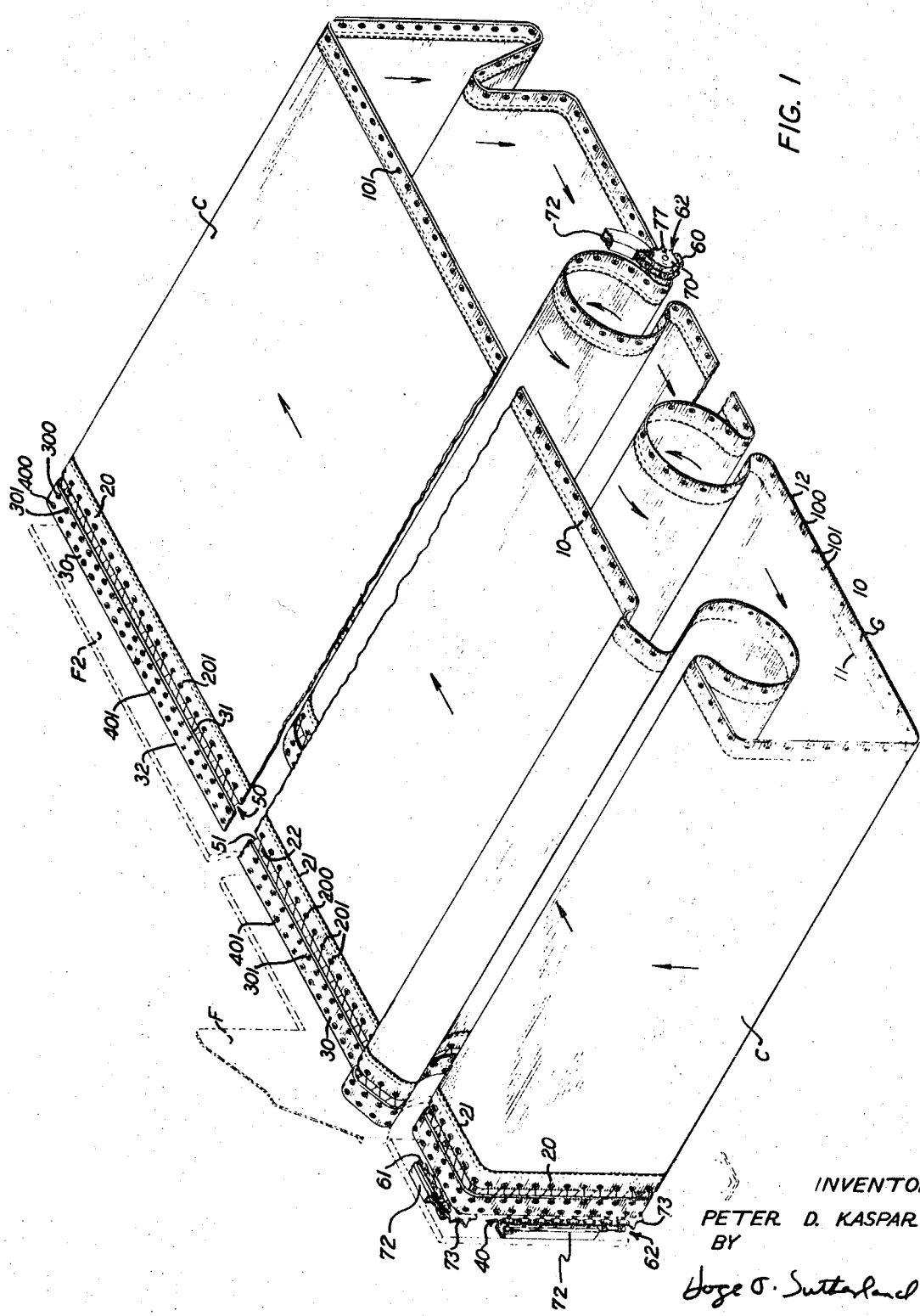
FIG. 1 is a perspective view of the apparatus of this invention showing the flexible conveyor C travelling in straight and curved paths and further showing its associated supporting, tensioning, and driving means, in detail, with certain parts omitted for clarity.

Referring to the drawing, the apparatus of this invention includes a flexible conveyor belt C which is movably mounted on a frame F having spaced upright frame members $F^1$ and $F^2$.

Figure 2:
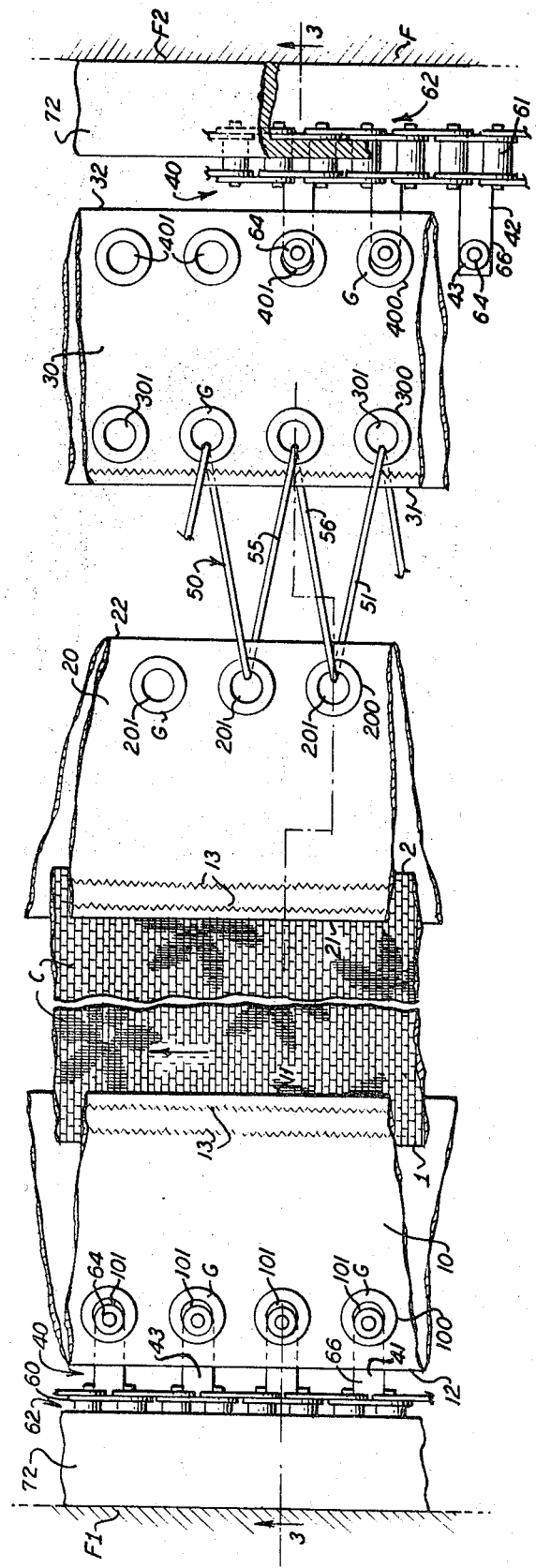
FIG. 2 is a fragmentary plan view of the apparatus of this invention (partly broken away from clarity) showing, with particular emphasis, the first and second strips at the edges of the conveyor, the intermediate tensioning means connected to the second strip and to a third strip spaced from the second strip, the apertures in these strips, and the first and third strips connected to the drive roller chains which drive the conveyor; and, FIG. 3 is a sectional view of the apparatus of this invention taken along line 3–3 of FIG. 2.
Figure 3:
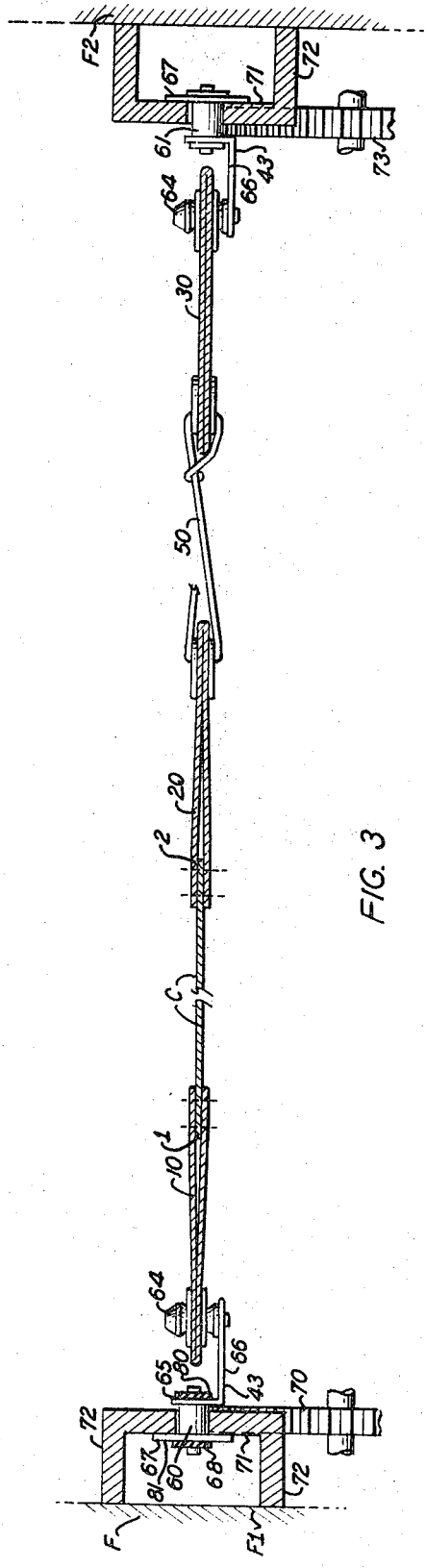

The conveyor belt C has a first longitudinal extending edge 1 and a second longitudinal extending edge 2, as shown most clearly in FIGS. 2 and 3. Such conveyor belt C may be solid for foraminous, is relatively thin, and preferably is longer than it is wide.

A first conveyor edge binding or border strip 10 is folded around and secured at its inner edge 11 to the first edge 1 of the conveyor C substantially throughout its length and a second conveyor edge binding strip 20 is folded around and secured at its inner edge 21 to the second edge 2 of the conveyor, by appropriate means.

The first and second binding strips 10 and 20 are preferably of cloth that has almost zero stretch. A fine close weave of dacron has been found suitable for the purpose. The dacron binding strips 10 and 20 are folded over the first and the second edges 1 and 2 of the conveyor C, respectively, with their own two inner edges at approximately the same location, and the edge of the conveyor interposed between them and extending into about one-third the width of the doubled over strips. This sandwich, of conveyor edge reaching between two thicknesses of dacron, is now sewn together simultaneously, preferably by two rows of diagonal stitching 13.

A first row 100 of longitudinally extending apertures 101 is disposed adjacent the outer edge 12 of the first binding strip 10 and a second row 200 of longitudinally extending apertures 201 is disposed adjacent the outer edge 22 of the second binding strip 20.

The apertures 101 and 201 are punched through the dacron binding strips 10 and 20 only, near their outer folded over edges, and grommets G are inserted. These grommets G are uniformly spaced apart by a unit distance of not more than about one and half times the lateral distance from the grommet center to the lines of stitching that hold the binding strips 10 and 20 and conveyor C together. The edge bindings 10 and 20 extend substantially the long length of the conveyor C as do the rows of apertures 100 and 200.

A third drive chain roller strip 30 is adjustably connected to the second binding strip 20, in a manner to be described.

A third row 300 of longitudinally extending apertures 301 is disposed adjacent the inner edge 31 of the drive chain strip 30 and a fourth row 400 of longitudinally extending apertures 401 is disposed adjacent the outer edge 32 of the drive chain strip 30.

The apertures in the first, third and fourth rows 100, 300, and 400 are disposed in line with each other and the apertures in the second row 200 are staggered with respect to the apertures in rows 100, 300 and 400. Thus disposed, the corresponding apertures in rows 100, 300 and 400 respectively define successive lateral and parallel planes which are perpendicular to the first, third and fourth rows of apertures 100, 300 and 400 and the apertures 201 in the second row 200 are respectively staggered and centered between adjacent corresponding apertures in rows 100, 300 and 400, as shown most clearly in FIG. 2.

Conveyor belt supporting means 40, conveyor belt tensioning means 50, and conveyor belt driving means 62 are movably mounted on the frame F, as will be further explained, and means are provided to operably connect these supporting, tensioning, and driving means to the conveyor C, also further to be explained.

The conveyor supporting means 40 includes a first row 41 and a second row 42 of supporting members 43 extending longitudinally of the conveyor C and disposed parallel to each other.

Each of supporting members 43 includes a hook or bollard 64 mounted at the inner edge of an arm 66 which, in turn, is integral at its outer edge with the conveyor driving means 62.

The means to operably connect the conveyor C to the conveyor supporting means 40 includes means to detachably connect the first edge 1 of the conveyor C to the first row 41 of supporting members 43 and the second edge 2 of the conveyor C to the second row 42 of supporting members 43.

The conveyor tensioning means 50 comprises an elastic cord 51 which is slidably received in apertures 201 in row 200 in the second strip 20 and in apertures 301 in row 300 in the drive strip 30.

The means to operably connect the conveyor C to the conveyor tensioning means 50 includes means to adjustably connect the elastic cord 51 to the second edge 2 of the conveyor C and means to detachably connect the elastic cord 51 to the second row 42 of supporting members 43.

The driving means 62 includes a first longitudinally extending drive roller chain 60 and a second longitudinally extending drive roller chain 61, which are disposed parallel to each other.

The first drive chain 60 travels over a plurality of drive sprockets 70 adjacent the first edge 1 of the conveyor C and the second drive chain 61 travels over a plurality of drive sprockets 73 adjacent the second edge 2 of the conveyor C. The drive sprockets 70 and 73 are mounted for rotation on the frame F and preferably alternate sprockets are rotatably driven by an appropriate drive means, preferably in the form of a motor and connecting means, now shown.

It is important to note that the sprockets 70 and 73 are critically positioned at the points the conveyor C changes its direction of travel. Thus, for example, sprockets are positioned at the points the conveyor C enters the cylindrical paths and at the points the conveyor leaves the cylindrical paths, as shown in FIG. 1 (only the entrance sprocket 77 for one cylindrical path is shown, for clarity). Since the sprockets support the entire weight of the conveyor C and since the greatest stresses occur at the points the conveyor changes direction thereby accentuating the tensioning problem at such points, it has been found that by so positioning the sprockets, more effective support and tensioning is obtained.

In particular, the positioning of entrance and exit sprockets at the entrance and exit of each of the cylindrical paths, enables better and more uniform tensioning of the conveyor C as it travels in such cylindrical path and into and away from such path.

The first row 41 of supporting members 43 are integral with the first drive roller chain 60 of the conveyor feeding means 62 and the second row 42 of supporting members 43 are integral with the second drive roller chain 61 of the conveyor feeding means 62.

The means to operably connect the conveyor C to the conveyor driving means 62 includes means to detachably connect the first edge 1 of the conveyor C to the first row 41 of the supporting members 43 and the second edge 2 of the conveyor C to the second row 42 of supporting members 43. Thus, the conveyor belt C will be suspended, across its width between the supporting members 42, 43 of the conveyor belt drive.

The first edge 1 of the conveyor C with the first binding strip 10 is connected to the first drive chain 60 by placing the grommets G in the apertures 101 in the first strip 10 over the hooks or small bollards 64 mounted at the inner edges of arms 66 which are integral at their outer edges with the inner links 65 of the first drive chain 60.

The second edge 2 of the conveyor C with the second strip 20 is connected to the second drive chain 61. The inner edge 31 of the third drive chain strip 30 of doubled over suitably reinforced dacron, in effect a dacron tape, is connected to the second edge 2 of the conveyor C by threadingly inserting the elastic means 50 through the apertures 201 in the second row 200 in the second strip 20 and through the apertures 301 in the inner third row 300 in the third strip 30. The outer edge 32 of the drive strip 30 is connected to the second drive chain 61 by placing the grommets G in the apertures 201 in the outer fourth row 400 in the third strip 30 over the hooks or bollards 64 mounted at the inner edges of arms 66 which are integral at their outer edges with the links 65 of the second drive chain 61.

The inner third row 300 of apertures slidability receives the shock elastic means 50, in the form of an elastic cord 51, which is laced back and forth between these grommets in the third row 300 and the grommets in the apertures 201 in the second row 200 in second binding strip 20 that is secured to the conveyor C.

As has been previously described, the apertures 201 in row 200 are staggered with respect to the apertures in rows 100, 300, and 400. Thus, the cord 51 passes through the apertures 301 in row 300 and the staggered apertures 201 in row 200 to define a continuous zigzag triangular lacing pattern, as shown in FIGS. 1 and 2.

Laced in this manner, the shock cord lacing 51, which is under tension, provides both a lateral vector of stretch to keep the conveyor C taut, and longitudinal vectors which identify the conveyor C within close tolerances with the drive chains 60 and 61 in their uniform longitudinal advance to keep uniform tension in and throughout the conveyor C during its movement.

If desired, the apertures 301 in the third row 300 may be staggered with respect to the apertures in the first, second and fourth rows 100, 200, and 400, rather than having the apertures 201 in the second row 200 staggered with respect to the apertures in the first, third and fourth rows 100, 300, and 400.

The critical factor here is that the apertures 201 and 301 in the second and third rows 200 and 300 be staggered with respect to each other and that the apertures in the first and fourth rows 100 and 400 be parallel to each other.

With the apertures in the rows 200 and 300 thus staggered, when the conveyor C is driven by the first and second drive chains 60 and 61, the leading sections 55 and trailing sections 56 of the elastic cord 50 will be of equal length, and the cord 50 will tension the conveyor C equally throughout its area and, during its movement, will maintain such equal distribution of tension in the conveyor C.

If the apertures in rows 200 and 300 were not staggered, with respect to each other, the leading and trailing sections 55 and 56 of the cord 50 would not be of equal length and as the drive chain means 62 feeds the conveyor C in a longitudinal direction the sections 55 and 56 of the cord would slide within the apertures 201 and 301 in an attempt to attain equal length, thus creating unequal pulls and wrinkling of the conveyor C.

Accordingly, the staggered spacing of the apertures 201 in row 200 in the binding strip 20 at the second edge 2 of the conveyor C in relationship to the apertures 301 in row 300 in the chain strip 30 and the continuous lacing of the cord therebetween enables the various forces to be distributed smoothly, thereby keeping the lace taut and flat and wrinkle free.

The symmetry of the lacing of the elastic cord 51 is very important and even through the lacing may be made up of many short segments of elastic cord, the lacing should be done as if one long continuous piece of elastic cording has been used. The cord 51 connecting the conveyor C to the drive chain 61 must never have a break in its triangular pattern. If this should occur and the lacing is reversed, it will cause warping of the conveyor C on the machine.

The conveyor C must be exactly in line i.e., perpendicular to the machine flow direction. The first grommet G on opposite sides of the conveyor are to feed into the machine on exactly opposite chain hooks 64. It is important that these hooks 64 do not lead or lag from each other. If this occurs, again, the conveyor C will be warped.

Means are provided to serve as first thrust bearings 80 and second thrust bearing 81 for maintaining uniform thrust at each edge of the conveyor C throughout its travel. The first thrust bearing 80 comprises the first and second links 65 and 68 of the first and second drive chains 60 and 61 and fins or extensions 67 integral with the second links 68 of the drive chains 61 and 62 comprise the second thrust bearings 81.

The first and second drive chains 60 and 61 are each connected to drive sprockets 70 and 73 and the fins 67 which are integral with the chains 60 and 61 ride against the inner surface 71 of guide tracks 72, as seen most clearly in FIG. 2.

With the drive chains 60 and 61 thus connected to the sprockets 70 and 73 and continuously driven, the first and second links 65 and 68 of the first and second chains 60 and 61 cooperate with the inner and outer surfaces of the teeth of the drive sprockets 70 and 73 to create a first thrust and the fins 68 riding against the inner surface 71 of tracks 72 cooperate therewith to create a second thrust.

The drive sprockets 70 and 73 and the guide tracks 72 are disposed in a substantially continuous manner one adjacent the other throughout the course of travel of the conveyor C thereby providing substantially continuous thrust or tension for the conveyor at both its edges 1 and 2 through its travel. In other words, when a given point of the drive chains 60, 61 leaves the control of the drive sprockets 70 and 73, it immediately comes under the control of the guide tracks 72 and when leaving control of the tracks 72 immediately comes under control of the next in line sprockets 73 and 70, thus giving substantially continuous control and continuous tension to the conveyor C throughout its travel.

The sprockets 70 and 73 and tracks 72 are positioned to drive the conveyor in a horizontal plane, hence into a substantially cylindrical configuration and back to a horizontal plane, for reasons to be explained.

The flexible conveyor C may vary in dimension with time. It may gradually with flexing and any other causes yield progressively in small increments. Also with changes in the humidity and any other pertinent factors, it can expand and contract.

It is important to note that the unyielding attached first edge 1 of the conveyor C will remain always in the same lateral position, and thus will serve as an index for any controls and adjustments. The second edge 2 of the conveyor C only moves with changing width dimension, and the tension on the grip and the tautness of it remain essentially constant at all times.

If the width dimension of the conveyor changes so that there is inadequate uniform tension on the conveyor, the elastic cord 51 may be adjusted, by having it laced tighter, to provide correct tensioning. And, on the other hand, if too much tension is on the conveyor, the cord 51 may be loosened. Accordingly, elastic cord 51 serves as a single means to quickly provide proper uniform tension in the conveyor C.

It will be noted that the first edge 1 of the conveyor C remains in constant substantially parallel alignment with the first drive chain 60 throughout its length and during conveyor travel. This occurs because of the direct attachment of the first strip 10 at edge 1 of the conveyor C to the first drive chain 60 throughout its length with the outer edge 12 of the first strip 10 parallel to the first drive chain 60.

It is not necessary, however, to establish a constant substantially parallel alignment between the second edge 2 of the conveyor C and the drive chain 61 adjacent to it because such edge 2 is spaced from the second drive chain 61 and is only indirectly connected to it through the third drive chain strip 30. The outer edge 32 of the third strip 30 is in constant substantially parallel alignment with the drive chain 61.

The apparatus of this invention is particularly adapted to drive, support, and tension flexible conveyors that have a good deal of open work; i.e., a foraminous conveyor. Such conveyors are very easily distorted and are particularly difficult to keep wrinkle free during conveyor movement.

The flexible, foraminous conveyor C may have a lace-like design pattern, as shown in FIG. 2, or any other appropriate patterns.

The important thing to note is that applicant's apparatus will effectively drive foraminous conveyors, in various travel paths and effectuate uniform tensioning through the conveyors as they are driven.

The apparatus just described finds particular utility as a means for driving, supporting, and tensioning a flexible conveyor, in the form of a foraminous forming conveyor having a lace-like design, in forming foraminous material or composite material of the type described in copending patent application Ser. No. 428,071, filed Jan. 26, 1965, and patent application Ser. No. 706,066, filed Feb. 16, 1968 and Ser. No. 820,040, filed Apr. 8, 1969.

An apparatus for making such foraminous material and composite material, as more fully shown and described in patent application Ser. No. 705,210, filed Feb. 13, 1968, includes means for driving a foraminous forming conveyor having a flat impervious forming surface in an arcuate, substantially cylindrical configuration past a depositing means or a plurality of depositing means and for depositing elastomeric material in particulate form onto the forming conveyor at a constant normal angle thereto to form, with repeated depositions or progressive depositions, a foraminous base ply (foraminous material) of desired thickness and having greatly enhanced physical properties.

Once the desired thickness of the base ply has been obtained, a first adhesive layer is deposited onto a first surface of such base ply and a first material is combined with it to form a 2-ply laminated composite material.

This 2-ply material is then stripped from the forming conveyor and a second adhesive layer is deposited onto the other or second surface of the base ply and a second material is then positioned onto this surface and laminated to the base ply to form a 3-ply composite material.

It is important that the elastomeric particles arrive at and onto the forming conveyor at an angle substantially normal to such forming conveyor, which, in turn, requires that the conveyor surface be smooth and wrinkle free as it receives the deposition material, and the apparatus of this invention accomplishes this difficult task to a high degree of certainty in a continuous operation.

I claim:

1. Apparatus for supporting, tensioning, and driving a flexible conveyor belt including:

a frame;

a flexible conveyor belt movably mounted on said frame and having a first longitudinally extending edge and a second longitudinally extending edge;

conveyor belt supporting means, conveyor belt tensioning means, and conveyor belt driving means, all movably mounted on said frame and operably connected to said conveyor belt along its longitudinal edges, with said conveyor belt being suspended therebetween, across the width thereof;

said conveyor belt tensioning means connected between at least one of said conveyor belt edges and its associated conveyor belt driving means;

said conveyor belt supporting means including a first and a second row of supporting members extending longitudinally of said conveyor belt, said first and second rows being disposed parallel to each other;

said first edge of said conveyor belt detachably connected to said first row of supporting members and said second edge of said conveyor belt detachably connected to said second row of supporting members;

said conveyor belt tensioning means including a continuous elastic means; and the connection of said conveyor belt to said conveyor belt tensioning means including means to adjustably connect said elastic means to said second edge of said conveyor belt and means to detachably connect said elastic means to said second row of supporting members.

2. In the apparatus of claim 1, said first and second rows of supporting members being integral with said conveyor belt driving means.

3. Apparatus for supporting, tensioning, and driving a flexible conveyor belt including:

a frame;

a flexible conveyor belt movably mounted on said frame and having a first and second longitudinally extending edge;

conveyor belt supporting means, conveyor belt tensioning means, and conveyor belt driving means, all movably mounted on said frame and operably connected to said conveyor belt along its longitudinal edges, with said conveyor belt being suspended therebetween, across the width thereof;

said conveyor belt tensioning means connected between at least one of said conveyor belt edges and its associated conveyor belt driving means;

said conveyor belt supporting means including a first and a second row of supporting members extending longitudinally of said conveyor belt, said first and second row being disposed parallel to each other;

said first edge of said conveyor belt detachably connected to said first row of supporting members and said second edge of said conveyor belt detachably connected to said second row of supporting members;

said conveyor tensioning means including a continuous longitudinally extending elastic means;

the connection of said conveyor belt to said conveyor belt tensioning means including means to adjustably connect said elastic means to said second edge of said conveyor belt and means to detachably connect said elastic means to said second row of supporting members;

said conveyor belt driving means including a first and a second longitudinally extending drive roller chain, said first and second chains being disposed parallel to each other;

means to drive said drive chains;

said first row of supporting members being integral with said first drive roller chain and said second row of supporting members being integral with said second drive roller chain; and the connection of said conveyor belt to said conveyor belt driving means including means to detachably connect said first edge of said conveyor belt to said first row of supporting members and said second edge of said conveyor belt to said second row of supporting members.

4. In the apparatus of claim 3, first thrust bearings comprising the first and second links of said first and second drive chains and second thrust bearings comprising extensions integral with the said second links of said first and second drive chains, said chains being connected to drive sprockets, track means mounted on said frame, said first and second links of said first and second chains cooperating with the inner and outer surfaces of the teeth of said sprockets to create a first thrust, said extensions riding against the inner surface of said tracks to create a second thrust.

5. In the apparatus of claim 4, said sprockets and said track means being substantially continuously disposed one adjacent the other throughout the course of travel of said conveyor belt so that tension is provided substantially throughout the travel of said conveyor belt.

6. Apparatus for supporting, tensioning, and driving a flexible conveyor including;

a frame;

a flexible conveyor movably mounted on said frame and having a first and a second longitudinally extending edge;

conveyor supporting means, conveyor tensioning means, and conveyor feeding means, all movably mounted on said frame;

means to operably connect said conveyor to said conveyor supporting means, to said conveyor tensioning means, and to said conveyor feeding means;

a first conveyor edge binding strip fixedly secured at its inner edge to said first edge of said conveyor substantially throughout its length;

a second conveyor edge binding strip fixedly secured at its inner edge to said second edge of said conveyor substantially throughout its length;

a second row of longitudinally extending apertures disposed adjacent the outer edge of said second binding strip;

a third drive chain strip adjustably connected to said second binding strip;

a third row of longitudinally extending apertures disposed adjacent the inner edge of said third drive chain strip;

said conveyor tensioning means adjustably connecting said second binding strip and said third drive chain strip together; and said first and second conveyor edge binding strips and said third chain drive strip being substantially dimensionally stable.

7. In the apparatus of claim 6, said apertures in said second row being staggered in relationship to said apertures in said third row.

8. In the apparatus of claim 7, said conveyor tensioning means being an elastic cord, said elastic cord being slidably positioned within said apertures in said second and said third row of apertures.

9. An apparatus as claimed in claim 6, including means to drive said conveyor in a substantially cylindrical path.

10. In the apparatus of claim 9, said means to drive said conveyor in a substantially cylindrical path including cylindrical track means mounted on said frame.

11. In the apparatus of claim 10, entrance sprockets being positioned at the points the conveyor enters said cylindrical path and exit sprockets at the points said conveyor leaves said cylindrical paths.

12. Apparatus for supporting, tensioning, and driving a flexible conveyor including;

a frame;

a flexible conveyor movably mounted on said frame and having a first and a second longitudinally extending edge;

conveyor supporting means, conveyor tensioning means, and conveyor feeding means, all movably mounted on said frame;

means to operably connect said conveyor to said conveyor supporting means, to said conveyor tensioning means, and to said conveyor feeding means;

a first conveyor edge binding strip fixedly secured at its inner edge to said first edge of said conveyor substantially throughout its length;

a second conveyor edge binding strip fixedly secured at its inner edge to said second edge of said conveyor substantially throughout its length;

a first row of longitudinally extending apertures disposed adjacent the outer edge of said first binding strip;

a second row of longitudinally extending apertures disposed adjacent the outer edge of said second binding strip;

a third drive chain strip adjustably connected to said second binding strip;

a third row of longitudinally extending apertures disposed adjacent the inner edge of said third drive chain strip;

a fourth row of longitudinally extending apertures disposed adjacent the outer edge of said third drive chain strip;

said conveyor tensioning means adjustably connecting said second binding strip and said third drive chain strip together; and said first and second conveyor edge binding strips and said third chain drive strip being substantially dimensionally stable.

13. In the apparatus of claim 12, said apertures in said second and third rows being staggered from each other.

14. In the apparatus of claim 12, said first, second, third and fourth rows of longitudinally extending apertures being parallel to each other with corresponding apertures in said first, third and fourth rows respectively defining successive lateral and parallel planes which are disposed perpendicular to said first, second, third, and fourth rows of longitudinally extending apertures, said apertures in said second row being staggered in relationship to said apertures in said first, third and fourth rows and respectively centered between adjacent corresponding apertures in said first, third, and fourth rows, said tensioning means being received within said apertures is said second and third rows so that when said conveyor is driven said staggered apertures in said second row remain substantially centered between said adjacent corresponding apertures in said first, third, and fourth rows.

15. In the apparatus of claim 12, said conveyor tensioning means being an elastic cord, said elastic cord being slidably received within said apertures in said second and said third rows and the sections of said cord between said apertures being of substantially equal length.

16. In the apparatus of claim 12, said first binding strip and said third chain drive strip being connected to said conveyor driving means.

17. In the apparatus of claim 16, said conveyor feeding means including a first and a second longitudinally extending drive roller chain, and said first and second chains being disposed parallel to each other.

18. In the apparatus of claim 17, said first edge of said conveyor being in substantially parallel alignment with said first drive chain throughout its length and said first binding strip being connected to said first drive chain.

19. In the apparatus of claim 17, said second edge of said conveyor being spaced from said second drive chain and said third drive strip being connected to said second drive chain with the outer edge of said third drive strip being in substantially parallel alignment with said second drive chain.

20. Apparatus for supporting, tensioning and driving a conveyor belt including:

a frame;

a conveyor belt movably mounted on said frame and having a first longitudinal edge and a second longitudinal edge;

conveyor belt supporting means, conveyor belt tensioning means and conveyor belt driving means mounted on said frame and operably connected to said conveyor belt along its longitudinal edges, with said conveyor belt being suspended therebetween, across the width thereof;

said conveyor belt tensioning means connected between at least one of said conveyor belt edges and its associated conveyor belt driving means; and said conveyor belt tensioning means including adjustable elastic means connected between said conveyor belt drive means and said one conveyor belt edge for providing a lateral vector of stretch and longitudinal vectors adapted to uniformly tension said conveyor belt during movement.

21. In the apparatus of claim 20, said conveyor belt being flexible.

22. In the apparatus of claim 20, said conveyor belt being foraminous.

23. In the apparatus of claim 20, said conveyor belt being foraminous and having a lace-like design.

24. In the apparatus of claim 20, said conveyor belt being continuous.

25. In the apparatus of claim 20, said flexible conveyor belt being nonstretchable.

26. In the apparatus of claim 20, said flexible conveyor belt being stretchable.